United States Patent
Okazaki et al.

(10) Patent No.: US 11,392,952 B2
(45) Date of Patent: Jul. 19, 2022

(54) FRAUD DETECTION SYSTEM, METHOD, AND NON-TEMPORARY COMPUTER READABLE STORAGE MEDIUM

(71) Applicants: Mitsuhiro Yamazaki, Tokyo (JP); Masaki Fukui, Tokyo (JP)

(72) Inventors: Kousuke Okazaki, Tokyo (JP); Keiko Hashizume, Tokyo (JP); Masanobu Miwa, Tokyo (JP); Mitsuhiro Yamazaki, Tokyo (JP); Masaki Fukui, Tokyo (JP)

(73) Assignees: Mitsuhiro Yamazaki, Tokyo (JP); Masaki Fukui, Tokyo (JP)

( * ) Notice: Subject to any disclaimer, the term of this patent is extended or adjusted under 35 U.S.C. 154(b) by 186 days.

(21) Appl. No.: 16/498,979

(22) PCT Filed: Oct. 30, 2018

(86) PCT No.: PCT/JP2018/040231
§ 371 (c)(1),
(2) Date: Sep. 27, 2019

(87) PCT Pub. No.: WO2019/088060
PCT Pub. Date: May 9, 2019

(65) Prior Publication Data
US 2021/0110398 A1   Apr. 15, 2021

(30) Foreign Application Priority Data
Oct. 30, 2017   (JP) .............................. JP2017-209374

(51) Int. Cl.
*G06Q 20/38*   (2012.01)
*G06Q 20/40*   (2012.01)

(52) U.S. Cl.
CPC ....... *G06Q 20/4016* (2013.01); *G06Q 20/382* (2013.01); *G06Q 20/385* (2013.01); *G06Q 20/4014* (2013.01)

(58) Field of Classification Search
CPC .................................................. G06Q 20/4016
(Continued)

(56) References Cited

U.S. PATENT DOCUMENTS

| 4,965,568 A | * | 10/1990 | Atalla ................ G06Q 20/4012 235/379 |
| 5,799,288 A | * | 8/1998 | Tanaka ................ G06Q 20/108 705/43 |

(Continued)

FOREIGN PATENT DOCUMENTS

| JP | 9-27002 A | 1/1997 |
| JP | 10-269182 A | 10/1998 |

(Continued)

OTHER PUBLICATIONS

International Search Report From PCT/JP2018/040231 Published on Sep. 5, 2019.

*Primary Examiner* — Chinedu C Agwumezie
(74) *Attorney, Agent, or Firm* — Tarolli, Sundheim, Covell & Tummino LLP (57) ABSTRACT

A fraud detection system that converts personal identification information into an irreversible code, acquires transaction information that includes transaction terminal identification information, stores the acquired transaction information in a transaction information storage unit, and calculates a respective transaction estimation value for a future transaction for each transaction terminal and each irreversible code, on the basis of the transaction information stored in the transaction information storage unit. When new transaction information is acquired the fraud detection system calculates a degree of deviation for the new transaction information on the basis of the transaction estimation value for the irreversible code and the transaction estimation value for the transaction terminal which are in accordance with the transaction terminal identification information included in the new transaction information, and outputs alert information when the degree of deviation is large.

11 Claims, 7 Drawing Sheets

(58) Field of Classification Search
USPC .......................................................... 705/75
See application file for complete search history.

(56) References Cited

U.S. PATENT DOCUMENTS

| | | | |
|---|---|---|---|
| 2010/0106611 A1* | 4/2010 | Paulsen | G07F 17/32 |
| | | | 705/40 |
| 2010/0327056 A1* | 12/2010 | Yoshikawa | G06Q 20/4016 |
| | | | 235/380 |
| 2015/0088746 A1* | 3/2015 | Hoffman | G06Q 20/40145 |
| | | | 705/44 |
| 2016/0132886 A1 | 5/2016 | Burke et al. | |
| 2017/0161745 A1 | 6/2017 | Hawkins | |

FOREIGN PATENT DOCUMENTS

| | | |
|---|---|---|
| JP | 2001-256395 A | 9/2001 |
| JP | 2002-123775 A | 4/2002 |
| JP | 2006-72575 A | 3/2006 |
| JP | 2010-282262 A | 12/2010 |
| JP | 2011-186923 A | 9/2011 |
| JP | 2012-506587 A | 3/2012 |
| JP | 5295418 B1 | 9/2013 |
| JP | 2014-78183 A | 5/2014 |

* cited by examiner

FRAUD DETECTION SYSTEM, METHOD, AND NON-TEMPORARY COMPUTER READABLE STORAGE MEDIUM

RELATED APPLICATIONS

The present invention is a U.S. National Stage under 35 USC 371 patent application, claiming priority to Serial No. PCT/JP2018/040231, filed on 30 Oct. 2018; which claims priority of JP 2017-209374, filed on 30 Oct. 2017, the entirety of both of which are incorporated herein by reference.

TECHNICAL FIELD

The present disclosure relates to a system, a method, and a non-transitory computer-readable medium for detecting that a transaction may be fraudulent.

BACKGROUND ART

In some cases, a fraudulent transaction may be performed using a cash card or the like in an automatic teller machine (ATM). Thus, a technique for detecting the possibility that a card is being used fraudulently has been proposed (for example, Patent Document 1). Patent Document 1 describes an assistance server including a usage content acquisition unit and a usage history memory. When receiving a request for the use of a card from an external device, the usage content acquisition unit acquires, from the external device, card identification information for identifying the card and a usage content indicating that the card is being used. The usage history memory stores the history of the usage content in correspondence with the card identification information of the card. The assistance server reads, from the usage history memory, a usage content prior to the request stored in correspondence with the card identification information corresponding to the request. Then, the assistance server compares the read usage content with the usage content acquired from the external device in correspondence with the request by the usage content acquisition unit, thereby calculating a divergence degree.

PRIOR ART DOCUMENT

Patent Document

Patent Document 1: Japanese Laid-Open Patent Publication No. 2006-72575.

SUMMARY OF THE INVENTION

Problems that the Invention is to Solve

However, in some cases, fraud cannot be detected with the conventional method using the transaction status of a user. For example, when a malicious user uses the cash card for an account opened in an overseas financial institution, the assistance server is unable to acquire information related to the usage status of the account. Thus, the assistance server cannot detect the fraud.

Means for Solving the Problem

To solve the above-described problem, one aspect according to the present disclosure provides a fraud detection system comprising a transaction information memory that stores transaction information associated with an irreversible code into which individual identification information has been converted and a controller that acquires a transaction request from a transaction terminal. The controller comprises circuitry. The circuitry is configured to convert the individual identification information into the irreversible code, which is unique, acquire transaction information including transaction terminal identification information, store the acquired transaction information in the transaction information memory, calculate, for each transaction terminal and for each irreversible code, a transaction estimation value for a future transaction based on the transaction information stored in the transaction information memory, when new transaction information is acquired, calculate a divergence degree of the new transaction information based on a transaction estimation value for a first transaction terminal and a transaction estimation value for an irreversible code that correspond to transaction terminal identification information included in the new transaction information, and when the divergence degree is large, output alert information.

Another aspect provides a fraud detection method for detecting fraud using a fraud detection system. The fraud detection system comprises a transaction information memory that stores transaction information associated with an irreversible code into which individual identification information has been converted and a controller that acquires a transaction request from a transaction terminal. The controller comprises circuitry. The circuitry performs converting the individual identification information into the irreversible code, which is unique, acquiring transaction information including transaction terminal identification information, storing the acquired transaction information in the transaction information memory, calculating, for each transaction terminal and for each irreversible code, a transaction estimation value for a future transaction based on the transaction information stored in the transaction information memory, when new transaction information is acquired, calculating a divergence degree of the new transaction information based on a transaction estimation value for a first transaction terminal and a transaction estimation value for an irreversible code that correspond to transaction terminal identification information included in the new transaction information, and when the divergence degree is large, outputting alert information.

A further aspect provides a non-transitory computer-readable medium storing a command for detecting fraud using a fraud detection system. The fraud detection system comprises a transaction information memory that stores transaction information associated with an irreversible code into which individual identification information has been converted and a controller that acquires a transaction request from a transaction terminal. The controller comprises circuitry. The instructions, when executed, causes circuitry of the controller to convert the individual identification information into the irreversible code, which is unique, acquire transaction information including transaction terminal identification information, store the acquired transaction information in the transaction information memory, calculate, for each transaction terminal and for each irreversible code, a transaction estimation value for a future transaction based on the transaction information stored in the transaction information memory, when new transaction information is acquired, calculate a divergence degree of the new transaction information based on a transaction estimation value for a first transaction terminal and a transaction estimation value for an irreversible code that correspond to transaction terminal identification information included in the new transaction information, and, when the divergence degree is large, output alert information.

MODES FOR CARRYING OUT THE INVENTION

A fraud detection system according to an embodiment will now be described with reference to FIGS. 1 to 6. In the present embodiment, it is assumed that a user performs a transaction (for example, cash withdrawal) using, in the transaction terminal of a bank (present bank), a cash card (medium) for an account opened at another bank (other banks).

Figure 1:
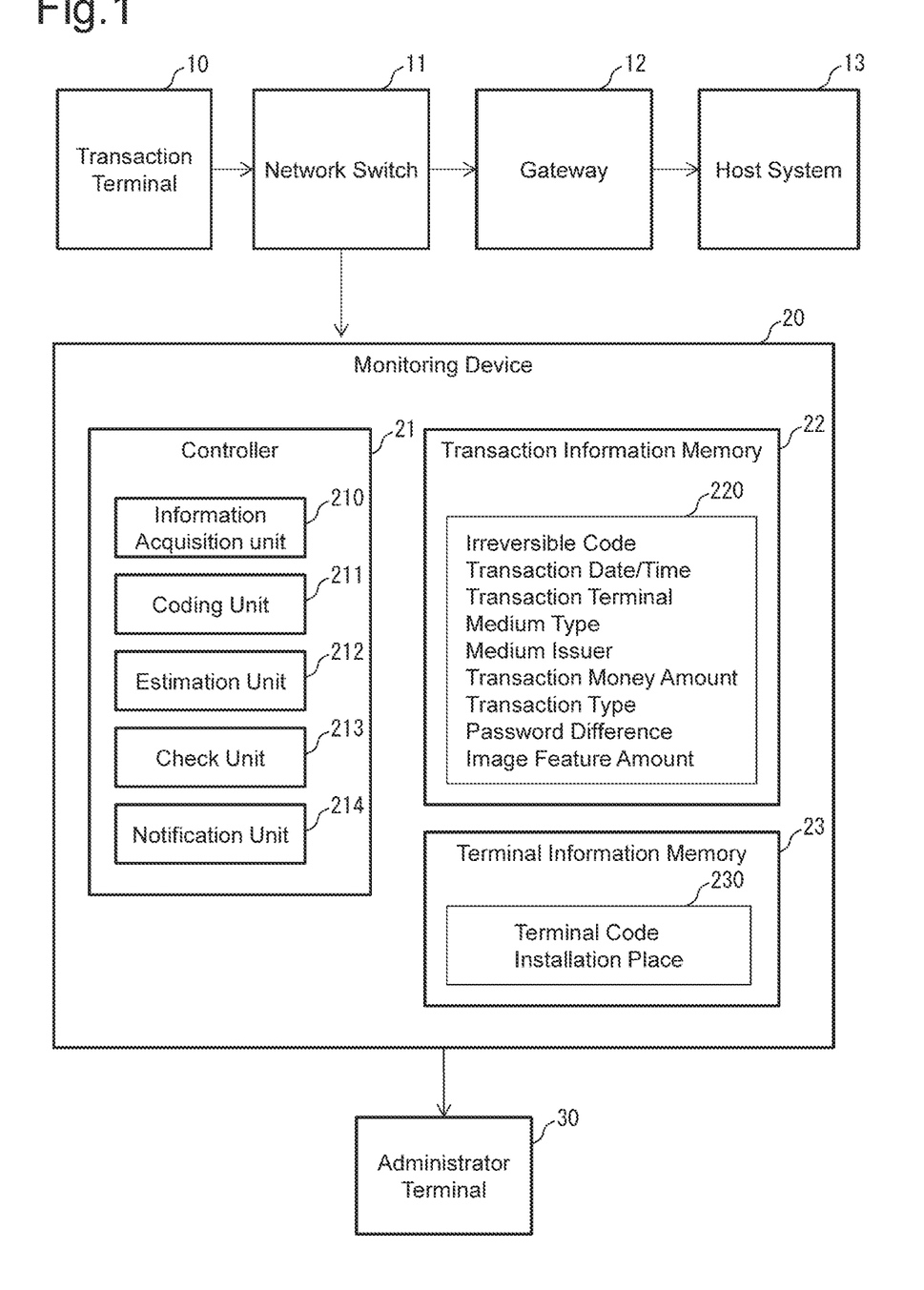
FIG. 1 is a schematic diagram illustrating a system of the present embodiment.

As shown in FIG. 1, when a user performs the transaction, a transaction terminal 10, a network switch 11, a gateway 12, and a host system 13 are provided.

The transaction terminal 10 is a terminal accepting a transaction request from a user and is, for example, an ATM. In the present embodiment, it is assumed that the transaction terminal 10 accepts the cash card of a user and deals with cash withdrawal (transaction request) using the cash card.

The network switch 11 executes a process for transferring a transaction request message, which is transmitted from the transaction terminal 10, to the gateway 12 and a monitoring device 20.

The gateway 12 is a computer server that connects the network switch 11 to the host system 13.

The host system 13 is a computer system that performs transaction processing in accordance with a transaction request message. In the present embodiment, the host system 13 provides a cash withdrawal service for another bank account determined based on the cash card of the user.

The monitoring device 20 is a computer system for determining whether a transaction may be fraudulent based on a transaction request message. The monitoring device 20 includes a controller 21, a transaction information memory 22, and a transaction information memory 23.

The controller 21 includes control means (for example, CPU, RAM, and ROM) and performs the processes described later (a group of processes including transaction information acquisition, coding, estimation, check, notification, and the like). By executing a check program for performing each of these processes, the controller 21 serves as an information acquisition unit 210, a coding unit 211, an estimation unit 212, a check unit 213, and a notification unit 214.

The information acquisition unit 210 executes a process for acquiring a transaction request message from the network switch 11.

The coding unit 211 executes a process for hashing individual information (card information) included in the transaction request message. The hashing converts the individual information into a unique code from which an individual can be identified. This code is an irreversible code from which individual information cannot be determined. A medium identifier of the cash card cannot be obtained from the irreversible code. Conversion is not limited to hashing as long as individual information can be converted into an irreversible code from which the individual information cannot be determined.

The estimation unit 212 performs Bayesian inference for the transaction information stored in the transaction information memory 22 to predict a transaction model that will be executed in the future. Based on the predicted transaction model, the estimation unit 212 executes a process for calculating an estimation value (transaction estimation value) indicating a transaction that is likely to be performed at this point in time.

The check unit 213 executes a process for checking divergence between the transaction estimation value calculated based on the predicted transaction model and check items for the acquired transaction request message. The check unit 213 holds the following data related to a threshold value transaction amount such that the divergence from the transaction estimation value can be determined.

A transaction amount divergence threshold value for determining a large divergence of a transaction amount.

A transaction content divergence threshold value for determining a large divergence of a transaction content.

A medium attribute threshold value for determining a large divergence of the distribution of a medium attribute (attribute type and/or attribute issuer).

A successive use number threshold value for determining the divergence of the number of successive uses by the user.

A standard movement speed between transaction terminals when multiple transaction terminal 10 are used.

A regular usage threshold value number for determining the usage status when the transaction terminal 10 is normally used.

The check unit 213 stores the check result of each check item in a memory and performs a multifaceted check based on the check result of each check item.

The notification unit 214 executes a process for notifying the user of warning (alert information) based on the check result of the transaction request message.

The transaction information memory 22 stores a transaction management record 220, which describes the transaction history of a user. The transaction management record 220 includes the transaction history of a transaction such as cash-out in a store other than a bank (for example, convenience store). The transaction information memory 22 stores the transaction management record 220 when the transaction request message from the transaction terminal 10 is acquired via the network switch 11. The transaction management record 220 includes data related to an irreversible code, transaction date/time, transaction terminal, medium type, medium issuer, transaction money amount, transaction type, password difference, and image feature amount.

An irreversible code data region stores data related to an identifier that uniquely determines user information and/or medium information that is used for a transaction (individual identification information such as card number and/or account number determined by cash card). In the present embodiment, the irreversible code data region stores a code obtained by hashing the medium identifier of a cash card used for a transaction in the transaction terminal 10. That is, although the cash card used for a transaction can be identified, the medium information used for a transaction cannot be determined.

A transaction date/time data region stores data related to an identifier that determines the year, month, day, and time on which the transaction request message was acquired.

A transaction terminal data region stores data related to an identifier of the transaction terminal 10 to determine a place where a transaction was performed. In the present embodiment, the transaction terminal data region stores a terminal code (IP address) for determining the transaction terminal 10.

The data region of a medium type stores data related to medium type (medium such as IC or magnetic stripe (MC)). The data region of a medium issuer stores data related to a medium issuer (BIN code: issuer identification number).

A transaction money amount data region stores data related to a transaction money amount included in a transaction request message.

A transaction type data region stores data related to an identifier that determines the transaction type of a transaction request message.

A password difference data region stores the occurrence of incorrect password entries in a transaction corresponding to the transaction management record 220.

An image feature amount data region stores data related to person feature information of a user photographed in the transaction terminal 10. In the present embodiment, the person feature information is the feature amount of the facial image of a user.

The transaction information memory 23 stores a terminal management record 230 for the transaction terminal 10. The transaction information memory 23 stores the terminal management record 230 when the transaction terminal 10 is installed. The terminal management record 230 includes data related to a terminal code and an installation place.

A terminal code data region stores data related to an identifier that determines the transaction terminal 10.

An installation place data region stores data related to a place where the transaction terminal 10 is installed (store type and/or address), which is determined by the identifier.

An administrator terminal 30 is connected to the monitoring device 20. The administrator terminal 30 is a computer terminal used by an administrator who monitors a transaction.

FIG. 2 illustrates a model for detecting a transaction including divergence from a transaction estimation value in a normal transaction in the monitoring device 20. In the present embodiment, a transaction model related to a user and/or a transaction model related to the transaction terminal 10 are used.

The transaction model for checking the transaction terminal 10 is a model shown in FIGS. 2A to 2D.

Figure 2A:
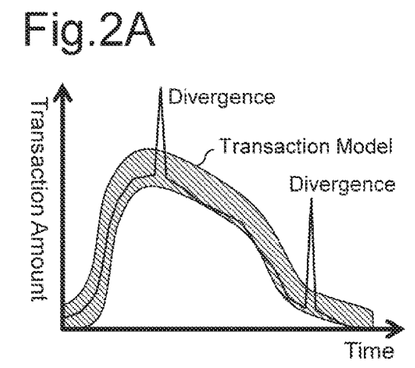
FIG. 2A is a graph of a transaction model in the system of FIG. 1, illustrating a terminal transaction model of a transaction amount.

FIG. 2A shows a terminal transaction model related to a time period dependence of a transaction amount in a particular transaction terminal 10. The check unit 213 uses a model corresponding to the transaction terminal to determine a "sudden increase in the transaction amount," which is a transaction that is divergent from the transaction amount distribution (transaction estimation value) predicted through Bayesian inference of the transaction terminal 10.

Figure 2B:
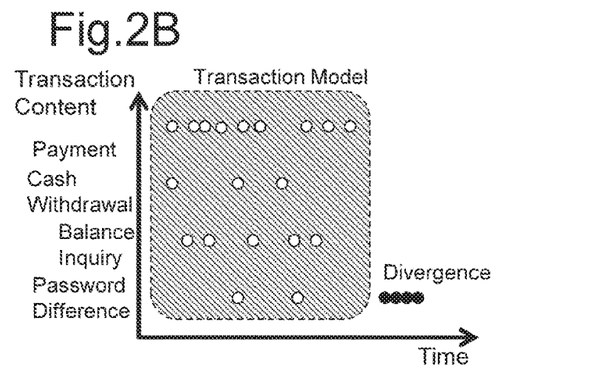
FIG. 2B is a graph of a transaction model in the system of FIG. 1, illustrating a terminal transaction model of a transaction content.

FIG. 2B shows a terminal transaction model related to a time period dependence of a transaction content in a particular transaction terminal 10. The check unit 213 uses a model corresponding to the transaction terminal to determine the "successive occurrence (successiveness) of a particular transaction content (password difference)," which is a transaction divergent from the occurrence frequency (transaction estimation value) of a transaction content (for example, password difference) predicted through Bayesian inference of the transaction terminal 10. The transaction content is not limited to password difference. The check unit 213 may determine the successive occurrence of, for example, cash withdrawal at a frequency divergent from the transaction estimation value.

Figure 2C:
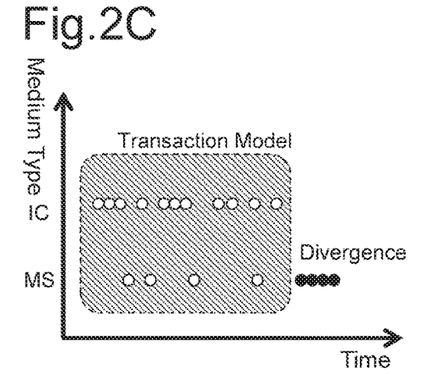
FIG. 2C is a graph of a transaction model in the system of FIG. 1, illustrating a terminal transaction model of a medium type.

FIG. 2C shows a terminal transaction model related to the distribution of the medium type (medium such as IC or magnetic stripe (MC)) of the card used in a particular transaction terminal 10. The check unit 213 uses a model corresponding to the terminal to determine the "successive use (successiveness) of a particular medium type," which is a transaction divergent from the use frequency (transaction estimation value) of a medium type predicted through Bayesian inference of the transaction terminal 10.

Figure 2D:
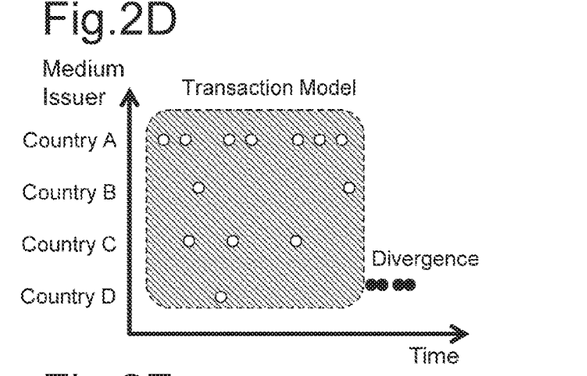
FIG. 2D is a graph of a transaction model in the system of FIG. 1, illustrating a terminal transaction model of a medium issuer.

FIG. 2D shows a terminal transaction model related to the distribution of the medium issuer (a BIN code from which the issuing country can be determined) of the card used in a particular transaction terminal 10. The check unit 213 uses a model corresponding to the terminal to determine the "successive use (successiveness) of a particular medium," which is a transaction divergent from the frequency (transaction estimation value) of a BIN code predicted through Bayesian inference of the transaction terminal 10.

Figure 2E:
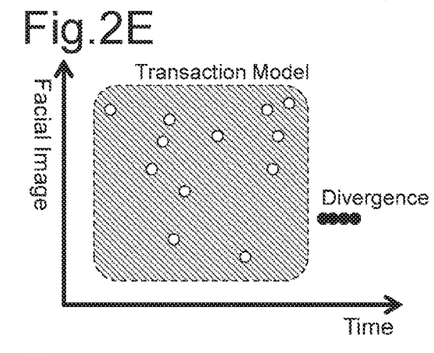
FIG. 2E is a graph of a transaction model in the system of FIG. 1, illustrating a terminal transaction model of a facial image.

FIG. 2E shows a terminal transaction model related to the distribution of the facial image of the user in a particular transaction terminal 10. The check unit 213 uses a model corresponding to the terminal to determine the "successive use (successiveness) by a particular user," which is a transaction divergent from the distribution (transaction estimation value) of a user predicted through Bayesian inference of the transaction terminal 10.

Figure 2F:
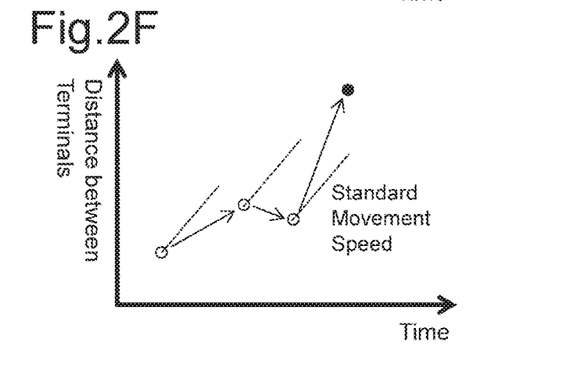
FIG. 2F is a graph of a transaction model in the system of FIG. 1, illustrating a user transaction model of a use location (successiveness).
Figure 2G:
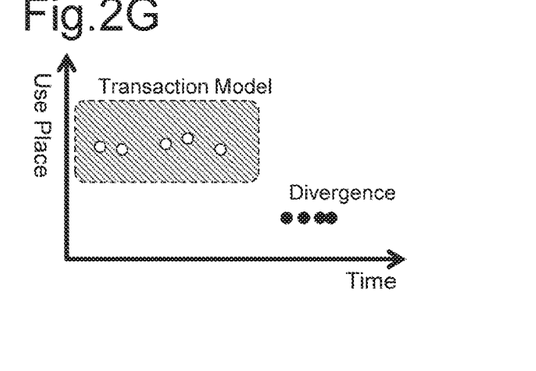
FIG. 2G is a graph of a transaction model in the system of FIG. 1, illustrating a user transaction model of a use location (statistical properties).

FIGS. 2F and 2G each show a transaction model for checking a medium (irreversible code).

FIG. 2F shows a user transaction model related to the use location (successiveness) of a particular card (the medium of a particular irreversible code). The check unit 213 uses a model corresponding to the card to determine divergence from the "range of successive use (successiveness) of a particular medium" in a transaction using multiple transaction terminals 10 arranged at a place exceeding a range (transaction estimation value) movable at a standard movement speed.

FIG. 2G shows a user transaction model related to the use location (statistical properties) of a particular card (the medium of a particular irreversible code). The check unit 213 uses a model corresponding to the card to determine divergence from the "usage range (statistical properties) of a particular medium" in a transaction at a place that differs from a place with high frequency of use (a transaction terminal 10 where a transaction is estimated to be performed) predicted through Bayesian inference.

Further, the same model as the model of FIG. 2E, which is related to the distribution of the facial image of the user in a particular irreversible code, may be used as a user transaction model. The check unit 213 uses this model to determine the use by a "different user" in a transaction divergent from the distribution (transaction estimation value) of a user predicted through Bayesian inference of the irreversible code.

In addition, the same model as the model of FIG. 2B, which is related to the distribution of a transaction type in a particular irreversible code, may be used as a user transaction model. The check unit 213 uses this model to determine a "different transaction type" in a transaction divergent from the use frequency (transaction estimation value) of a particular medium predicted through Bayesian inference of the irreversible code.

FIGS. 3 to 6 each illustrate the flow of a fraud detection process in the monitoring device 20.

Fraud Detection Process

Figure 3:
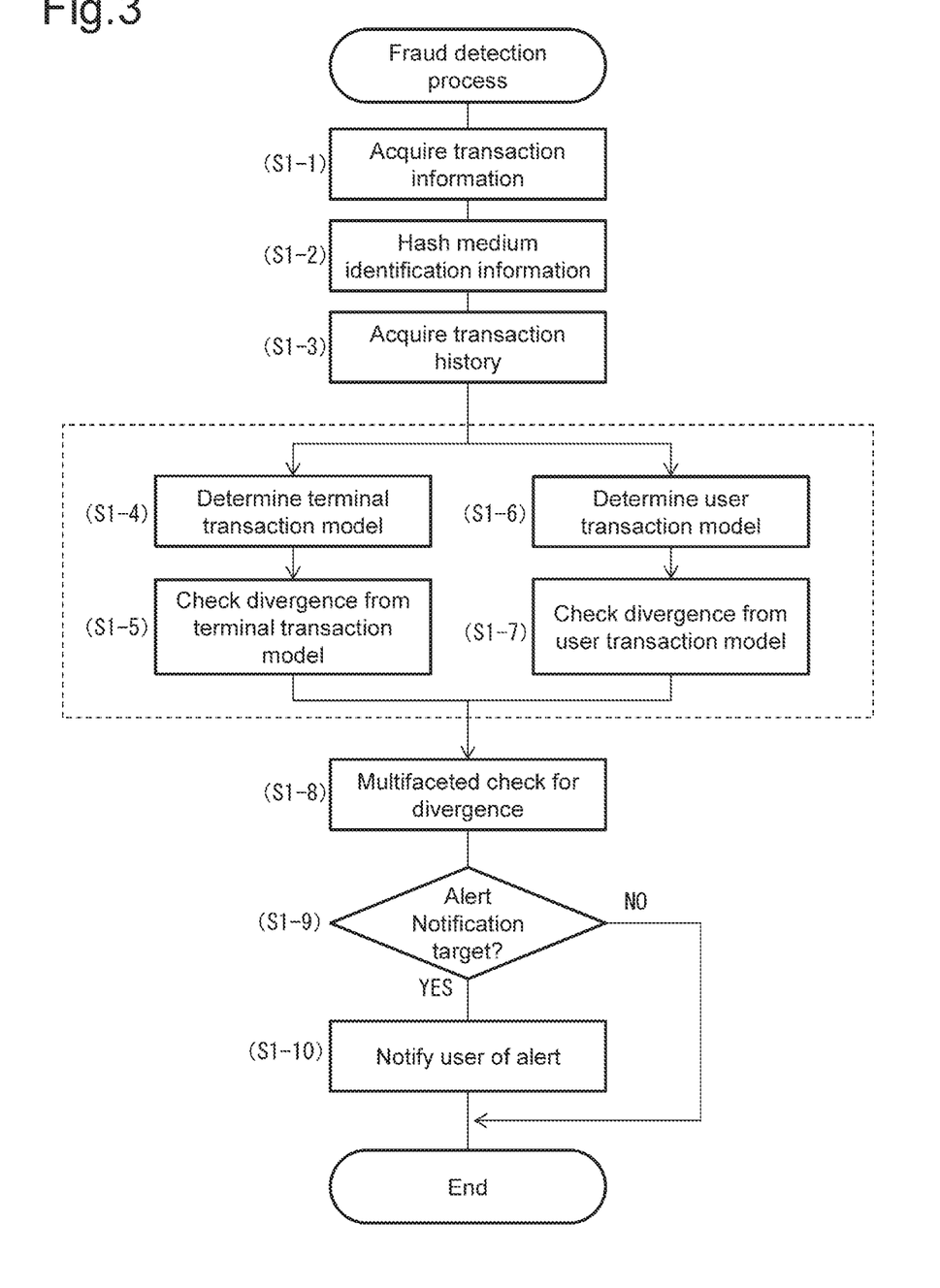
FIG. 3 is a flowchart illustrating a process flow in the system of FIG. 1.

FIG. 3 illustrates the flow of the fraud detection process.

First, the controller 21 executes a process for acquiring transaction information (S1-1). More specifically, when a user inputs a transaction request in a transaction terminal 10, the transaction terminal 10 transmits a transaction request message to the host system 13 via the network switch 11 and the gateway 12. The transaction request message includes data related to a medium identifier, a terminal code, medium information (medium type), a transaction money amount, a transaction type, and a facial image feature amount, which are used for a transaction. The information acquisition unit 210 acquires the transaction request message from the network switch 11. The information acquisition unit 210 determines the medium issuer based on the medium identifier included in a transaction request message.

Next, the controller 21 executes a process for hashing medium identification information (S1-2). More specifically, the coding unit 211 calculates an irreversible code (hash value) by substituting the medium identifier into a hash function.

Subsequently, the controller 21 executes a process for acquiring a transaction history (S1-3). More specifically, during a predetermined period (sampling period), the information acquisition unit 210 acquires a transaction management record 220 storing, in the transaction terminal data region, a terminal code included in the transaction request message and acquires a transaction management record 220 storing the irreversible code calculated in S1-2 from the transaction information memory 22.

The controller 21 uses the above-described terminal transaction model and/or user transaction model to check a transaction request that has been input by the user.

The controller 21 executes a process for determining a terminal transaction model (S1-4). More specifically, the estimation unit 212 determines the terminal transaction model in each transaction terminal 10 for each check item using the transaction management record 220 storing, in the transaction terminal data region, the terminal code included in the transaction request message.

Afterwards, the controller 21 executes a process for checking divergence from the terminal transaction model (S1-5). More specifically, the check unit 213 checks, for each check item, the content of the current transaction request and the magnitude of divergence (divergence degree) from the transaction estimation value during a transaction based on the transaction request in the terminal transaction model. The detail of the check will be described later with reference to FIGS. 4 and 5.

Further, the controller 21 executes a process for determining the user transaction model (S1-6). More specifically, the estimation unit 212 uses a transaction management record 220 storing the calculated irreversible code to determine the user transaction model by a particular medium for each check item.

Figure 6A:
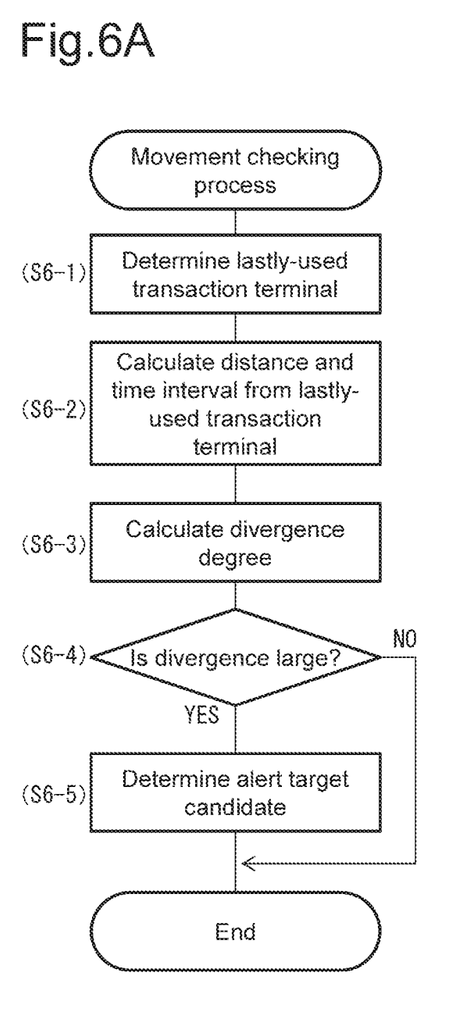
FIG. 6A is a flowchart of a process flow in the system of FIG. 1, illustrating a movement evaluation process.
Figure 6B:
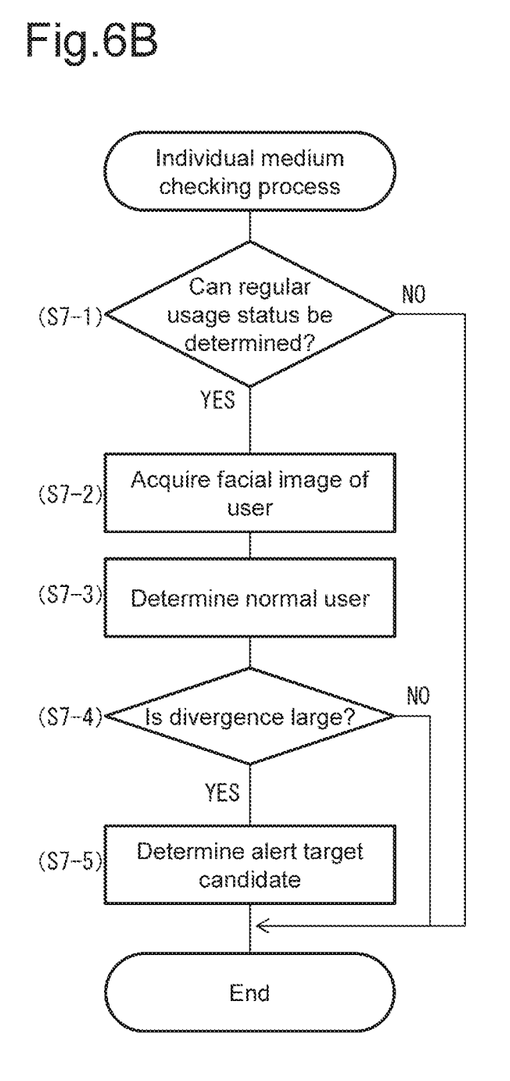
FIG. 6B is a flowchart of a process flow in the system of FIG. 1, illustrating an individual medium evaluation process.

Subsequently, the controller 21 executes a process for checking divergence from the user transaction model (S1-7). More specifically, the check unit 213 checks, for each check item, the content of the current transaction request and the magnitude of divergence (divergence degree) from the transaction estimation value during the transaction based on the transaction request in the user transaction model. The detail of the check will be described later with reference to FIG. 6.

Then, the controller 21 executes a multifaceted check process for divergence (S1-8). More specifically, the check unit 213 collectively checks item-by-item check results of the check result stored in the memory (a divergence range from the transaction estimation value of a terminal transaction model and a divergence range from the transaction estimation value of a user transaction model). The check unit 213 expands the check result of divergence of each check item to multiple check axes and calculates the multifaceted check result based on the expansion situation. The check unit 213 calculates the multifaceted check result by, for example, calculating the distribution form of the divergence when the result is expanded to the multiple check axes.

Subsequently, the controller 21 executes a process for determining whether an alert notification target exists (S1-9). More specifically, the check unit 213 determines whether the multifaceted check result exceeds an alert notification threshold value. For example, when the distribution form expanded in the magnitude of divergence to multiple check axes (check items) exceeds a predetermined form (alert notification threshold value), the controller 21 determines that the alert notification target exists.

When determining that the alert notification target exists ("YES" in S1-9), the controller 21 executes an alert notification process (S1-10). More specifically, the notification unit 214 notifies the administrator terminal 30 of warning. Warning may be performed using an alarm.

When determining that the alert notification target does not exist ("NO" in S1-9), the controller 21 skips the alert notification process (S1-10).

The check of each check item of a transaction request message (S1-4 to S1-7) using the terminal transaction model and the user transaction model predicted through Bayesian inference will now be described.

Transaction Amount Checking Process

Figure 4A:
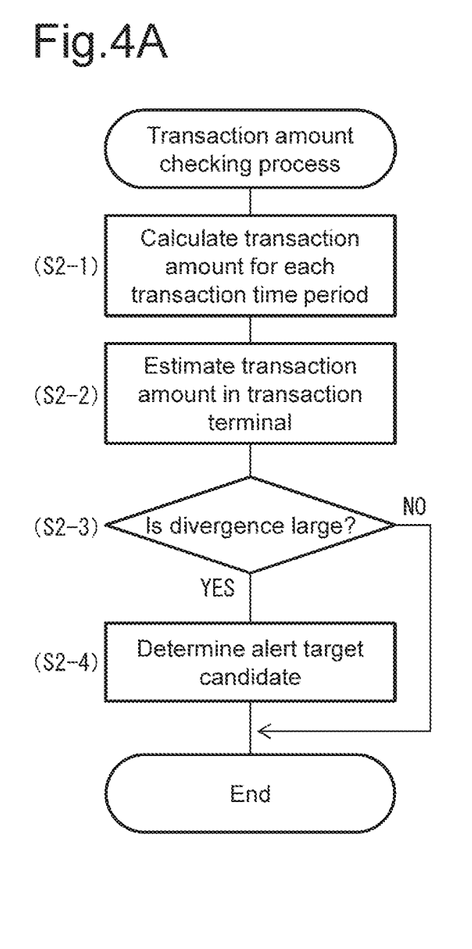
FIG. 4A is a flowchart of a process flow in the system of FIG. 1, illustrating a transaction amount evaluation process.

FIG. 4A illustrates the flow of the transaction amount checking process.

First, the controller 21 executes a process for calculating the transaction amount for each transaction time period (S2-1). More specifically, the estimation unit 212 uses a transaction management record 220 storing, in the transaction terminal data region, the terminal code of a transaction terminal 10 that transmitted a transaction request message, thereby counting the number of records for each transaction time period and calculating the transaction amount (terminal transaction model) in the transaction terminal 10. The transaction time period includes a time period obtained by dividing the open hours into predetermined unit times such as 9:00 to 10:00 and 10:00 to 11:00.

Next, the controller 21 executes a process for estimating the transaction amount in the transaction terminal (S2-2). More specifically, the estimation unit 212 uses the terminal transaction model of the transaction amount of each time period to predict the transaction amount (transaction estimation value) of the current point in time.

Subsequently, the controller 21 executes a process for determining whether the divergence from an estimation value is large (S2-3). More specifically, the check unit 213 calculates the divergence range by comparing the estimation value with the transaction amount in a most-recent predetermined period (check period). When the divergence range exceeds the transaction amount divergence threshold value, the check unit 213 determines that the divergence from the estimation value is large.

When the check unit 213 determines that the divergence from the estimation value is large ("YES" in S2-3), the controller 21 executes an alert target candidate determination process (S2-4). More specifically, the check unit 213 temporarily stores a transaction request message as an alert target candidate in the memory. In this case, the check unit 213 temporarily stores the divergence range as a transaction amount check result.

When the check unit 213 determines that the divergence from the estimation value is small ("NO" in S2-3), the controller 21 skips the alert target candidate determination process (S2-4).

Transaction Content Checking Process

Figure 4B:
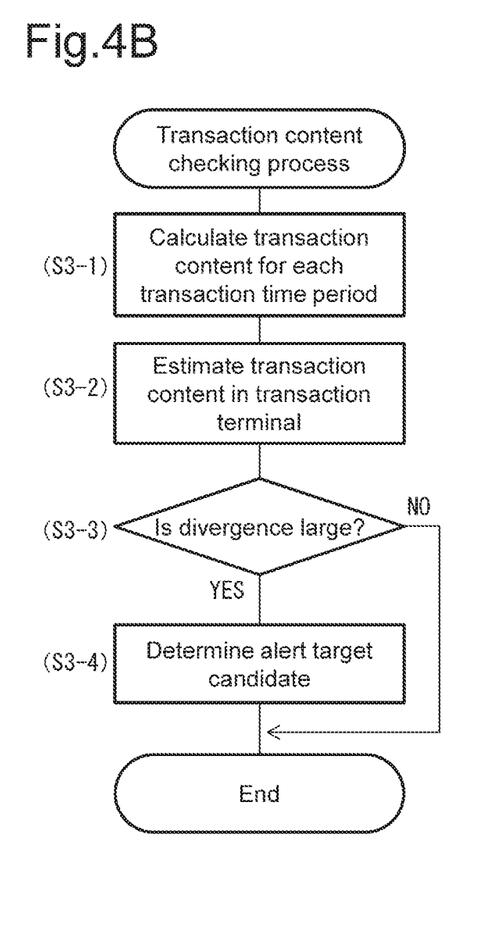
FIG. 4B is a flowchart of a process flow in the system of FIG. 1, illustrating a transaction content evaluation process.

FIG. 4B illustrates the flow of the transaction content checking process.

First, the controller 21 executes a process for calculating the transaction content for each transaction time period (S3-1). More specifically, the estimation unit 212 uses the transaction management record 220 storing, in the transaction terminal data region, the terminal code of the transaction terminal 10 that transmitted the transaction request message, thereby counting the number of records for each transaction time period of each transaction content (transaction type and password difference) in the transaction terminal 10 and calculating the distribution (terminal transaction model) of the transaction content.

Next, the controller 21 executes a process for estimating the transaction content in the transaction terminal (S3-2). More specifically, the estimation unit 212 uses the terminal transaction model of the transaction content of each time period to predict the distribution (transaction estimation value) of the transaction content of the current point in time.

Subsequently, the controller 21 executes a process for determining whether the divergence from an estimation value is large (S3-3). More specifically, the check unit 213 calculates the divergence range by comparing the estimation value with the distribution of the transaction content in the most-recent predetermined period (check period). When the divergence range exceeds the transaction content divergence threshold value, the check unit 213 determines that the divergence from the estimation value is large.

When the check unit 213 determines that the divergence from the estimation value is large ("YES" in S3-3), the controller 21 executes the alert target candidate determination process (S3-4). More specifically, the check unit 213 temporarily stores a transaction request message as an alert target candidate in the memory. In this case, the check unit 213 temporarily stores the divergence range as a transaction content check result.

When the check unit 213 determines that the divergence from the estimation value is small ("NO" in S3-3), the controller 21 skips the alert target candidate determination process (S3-4).

Medium Attribute Checking Process

Figures 5A, 5B:
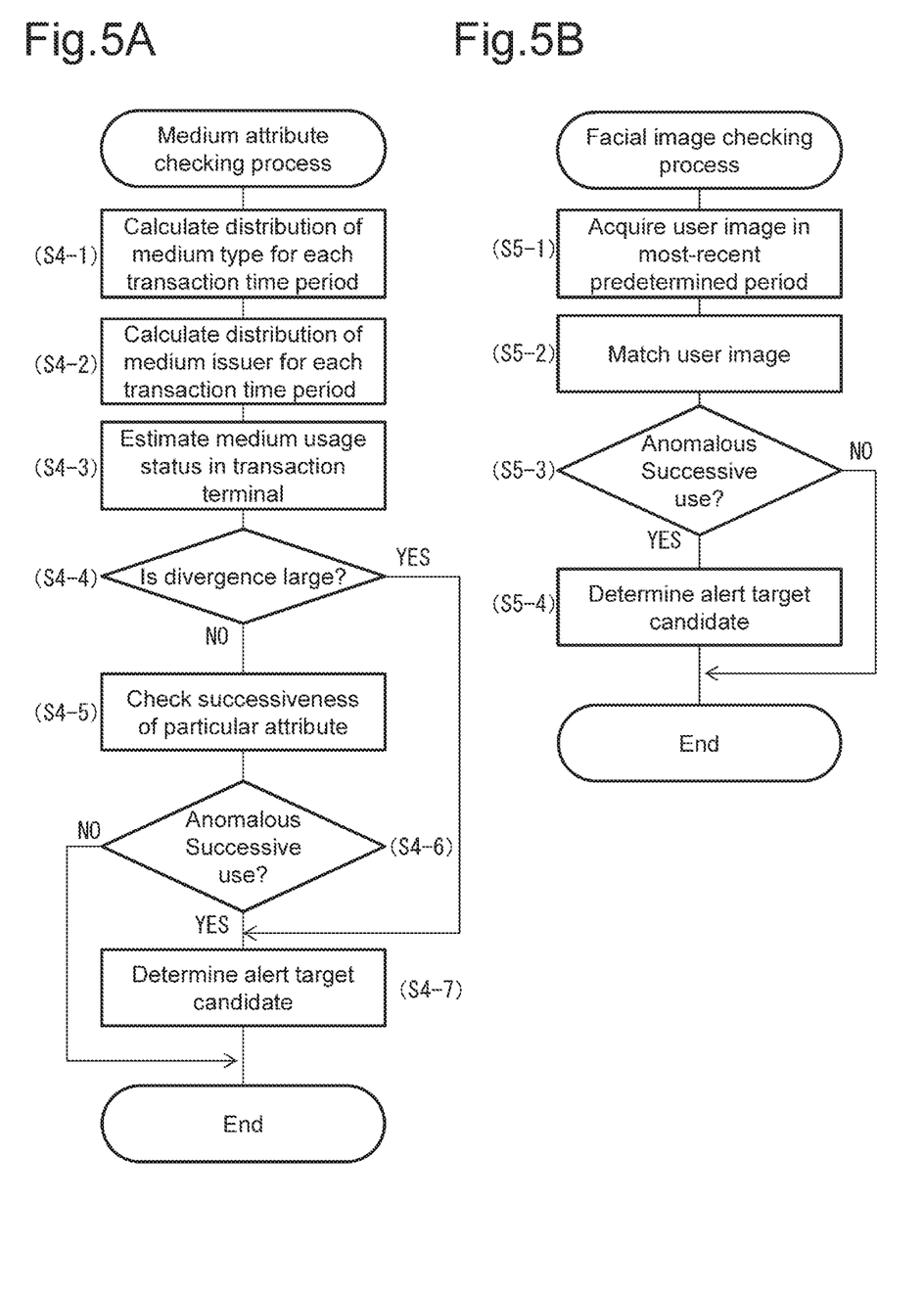
FIG. 5A is a flowchart of a process flow in the system of FIG. 1, illustrating a medium attribute evaluation process.
FIG. 5B is a flowchart of a process flow in the system of FIG. 1, illustrating a facial image evaluation process.

FIG. 5A illustrates the flow of the medium attribute checking process.

First, the controller 21 executes a process for calculating the distribution of a medium type for each transaction time period (S4-1). More specifically, the estimation unit 212 counts, for each transaction time period and for each medium type, the number of the transaction management records 220 storing, in the transaction terminal data region, the terminal code of the transaction terminal 10 that transmitted the transaction request message, thereby calculating the distribution (terminal transaction model) of the medium type in the transaction terminal 10, that is, the distribution of the medium type of a medium used in the transaction terminal 10.

Next, the controller 21 executes a process for calculating the distribution of a medium issuer for each transaction time period (S4-2). More specifically, the estimation unit 212 counts, for each transaction time period and for each medium issuer, the number of the transaction management records 220 storing, in the transaction terminal data region, the terminal code of the transaction terminal 10 that transmitted the transaction request message, thereby calculating the distribution (terminal transaction model) of the medium issuer in the transaction terminal 10, that is, the distribution of the medium issuer of a medium used in the transaction terminal 10.

Subsequently, the controller 21 executes a process for estimating a medium usage status in the transaction terminal (S4-3). More specifically, the estimation unit 212 uses the terminal transaction model of the medium type and the medium issuer for each time period to estimate the medium usage statuses (each transaction estimation value) of the medium type and the medium issuer at the current point in time.

Then, the controller 21 executes a process for determining whether the divergence from the estimation value is large (S4-4). More specifically, the check unit 213 compares each transaction estimation value with the medium usage statuses of the medium type and the medium issuer in the most-recent predetermined period to calculate the divergence ranges. When the divergence range of any one of the medium type and the medium issuer exceeds the medium attribute divergence threshold value, the check unit 213 determines that the divergence from the estimation value is large.

When the check unit 213 determines that the divergence from the estimation value is small ("NO" in S4-4), the controller 21 executes a process for checking the successiveness of a particular attribute (S4-5). More specifically, the check unit 213 calculates the number of times a transaction has been successively performed using the media of various medium types and/or medium issuers during the most-recent predetermined period (check period).

Afterwards, the controller 21 executes a process for determining whether the transaction corresponds to an anomalous successive use (S4-6). More specifically, the check unit 213 uses the terminal transaction model of the medium type and/or the medium issuer to calculate the number of times (transaction estimation value) the medium of the medium type and/or the medium issuer corresponding to the transaction request has been successively used. When the number of successive uses of the medium of the medium type and/or the medium issuer exceeds the estimation value, the check unit 213 determines that the transaction is an anomalous successive use.

When the check unit 213 determines that the divergence from the estimation value is large or that the anomalous successive use has occurred ("YES" in S4-4 or S4-6), the controller 21 executes the alert target candidate determination process (S4-7). More specifically, the check unit 213 temporarily stores, in the memory, the transaction request message corresponding to the transaction request as an alert target candidate. In this case, the check unit 213 temporarily stores, in the memory, the divergence range and the number of successive uses as medium attribute check results.

When the check unit 213 determines that the anomalous successive use has not occurred ("NO" in S4-6), the controller 21 skips the alert target candidate determination process (S4-7).

Facial Image Checking Process

FIG. 5B illustrates the flow of the facial image checking process.

First, the controller 21 executes a process for acquiring a user image in the most-recent predetermined period (S5-1). More specifically, the check unit 213 obtains from the transaction information memory 22 the transaction management record 220 in the most-recent predetermined period storing, in the transaction terminal data region, the terminal code of the transaction terminal 10 that transmitted the transaction request message. Next, the check unit 213 obtains the image feature amount stored in the transaction management record 220.

Subsequently, the controller 21 executes a process for matching the user image (S5-2). More specifically, the check unit 213 classifies users in a transaction terminal 10 based on the acquired image feature amount.

Afterwards, the controller 21 executes a process for determining whether the transaction corresponds to the anomalous successive use (S5-3). More specifically, the check unit 213 calculates the number of successive uses by a particular user to compare the calculated number of successive uses with the number threshold value (transaction estimation value). When the number of successive uses exceeds the successive use number threshold value, the check unit 213 determines that the anomalous successive use has occurred. In an embodiment, the estimation unit 212 may calculate the successive use number threshold value (transaction estimation value) based on past usage statuses (transaction models) of the transaction terminal 10.

When the check unit 213 determines that the anomalous successive use has occurred ("YES" in S5-3), the controller 21 executes the alert target candidate determination process (S5-4). More specifically, the check unit 213 temporarily stores, in the memory, the transaction request message corresponding to the transaction request as an alert target candidate. In this case, the check unit 213 temporarily stores the number of successive uses as a facial image check result.

When the check unit 213 determines that the anomalous successive use has not occurred ("NO" in S5-3), the controller 21 skips the alert target candidate determination process (S5-4).

Movement Checking Process

FIG. 6A illustrates the flow of the movement checking process.

First, the controller 21 executes a process for determining a lastly-used transaction terminal (S6-1). More specifically, the check unit 213 extracts a transaction management record 220 storing an irreversible code related to a transaction request message corresponding to a transaction request and storing the most-recent transaction date/time (lastly-used transaction management record 220). The check unit 213 determines a terminal code stored in the transaction terminal data region of the extracted transaction management record 220.

Next, the controller 21 executes a process for calculating the distance and transaction time interval from the lastly-used transaction terminal (S6-2). More specifically, the check unit 213 uses the transaction information memory 23 to determine the installation places of the lastly-used transaction terminal 10 and the currently-used transaction terminal 10, thereby calculating the distance between the two transaction terminals 10. Further, the check unit 213 calculates the difference between the current date/time and the transaction date/time of the lastly-used transaction management record 220 (transaction time interval).

Then, the controller 21 executes a process for calculating the divergence degree (S6-3). In this process, a generally movable range when multiple transaction terminals 10 are used is employed as a terminal transaction model. More specifically, the check unit 213 uses the following equation to calculate the divergence degree between the transaction terminal 10 that was used in the last transaction and the transaction terminal 10 that is being used in the current transaction.

$$[\text{Divergence Degree}]=[\text{Distance between Terminals}]/[\text{Transaction Time Interval} \times \text{Standard Movement Speed}]$$

The standard movement speed is determined in advance in accordance with the distance between terminals, and [Transaction Time Interval×Standard Movement Speed] serves as a transaction estimation value in a normal terminal transaction model. For example, the standard movement speed is an average movement speed of walking when the distance between terminals is less than or equal to a predetermined distance, and the standard movement speed is a movement speed with the use of transportation when the distance between terminals is greater than the predetermined distance. In an embodiment, the estimation unit 212 may calculate the standard movement speed (transaction estimation value) based on past usage statuses (transaction models) of two transaction terminals 10.

Subsequently, the controller 21 executes a process for determining whether the divergence is large (S6-4). More specifically, the check unit 213 compares the divergence degree with a movement threshold value and determines that the divergence is large when the divergence degree is greater than the threshold value.

When determining that the divergence is large ("YES" in S6-4), the controller 21 executes the alert target candidate determination process (S6-5). More specifically, the check unit 213 temporarily stores, in the memory, a transaction request message as an alert target candidate. In this case, the check unit 213 temporarily stores, in the memory, the divergence degree as a movement check result.

When the check unit 213 determines that the divergence is small ("NO" in S6-4), the controller 21 skips the alert target candidate determination process (S6-5).

Individual Medium Checking Process

FIG. 6B illustrates the flow of the individual medium checking process.

First, the controller 21 executes a process for determining whether a regular usage status can be determined (S7-1). More specifically, the estimation unit 212 calculates the number of records of a transaction management record 220 storing an irreversible code in the current transaction. Next, when the number of records is greater than or equal to a regular usage threshold value number, the estimation unit 212 determines that the regular usage status can be determined.

When the number of records is less than the regular usage threshold value number and thus the estimation unit 212 determines that the regular usage status cannot be determined ("NO" in S7-1), the controller 21 ends the individual medium checking process.

When the number of records is greater than or equal to the regular usage threshold value number and thus the estimation unit 212 determines that the regular usage status can be determined ("YES" in S7-1), the controller 21 executes a process for acquiring the facial image of a user (S7-2). More specifically, the estimation unit 212 acquires an image feature amount stored in the transaction management record 220.

Subsequently, the controller 21 executes a process for determining a normal user (S7-3). More specifically, the estimation unit 212 uses the acquired image feature amount to identify the user. When determining multiple users based on the image feature amount, the estimation unit 212 estimates all the determined multiple users as normal users. The estimation unit 212 uses the image feature amounts of the estimated normal users as transaction estimation values.

Then, the controller 21 executes a process for determining whether the divergence is large (S7-4). More specifically, the check unit 213 compares the image feature amount of the normal user with the image feature amount of the facial image in the current transaction. When the image feature amount of the facial image in the current transaction differs from the image feature amount of the normal user, the check unit 213 determines that the divergence is large.

When determining that the divergence is large ("YES" in S7-4), the controller 21 executes the alert target candidate determination process (S7-5). More specifically, the check unit 213 temporarily stores, in the memory, a transaction request message as an alert target candidate. In this case, when detecting multiple users as an individual medium check result in a situation in which only a particular user uses the medium (situation in which the number of normal users is small), the check unit 213 temporarily stores in the memory a large divergence range in accordance with the number of people.

When the check unit 213 determines that the divergence is small ("NO" in S7-4), the controller 21 skips the alert target candidate determination process (S7-5).

The present embodiment achieves the following advantages.

(1) The controller 21 executes the process for hashing the medium identification information (S1-2). This prevents the leakage of individual information. Particularly, in the system according to the present disclosure, a transaction model for detecting a transaction that may be fraudulent can be generated without individually identifying a user.

(2) The controller 21 executes the process for determining the terminal transaction model (S1-4) and the process for checking divergence from the terminal transaction model (S1-5). This allows the system to detect an anomalous transaction status using the transaction estimation value predicted based on the usage status of the transaction terminal 10.

(3) The controller 21 executes the process for determining the user transaction model (S1-6) and the process for checking divergence from the user transaction model (S1-7). This allows the system to detect an anomalous transaction status using the transaction estimation value predicted based on the usage status of a medium such as a cash card.

(4) The controller 21 executes the multifaceted check process for divergence (S1-8). This allows the system to use multiple check items to properly detect a transaction that may be fraudulent.

(5) The controller 21 executes the transaction amount checking process. This allows the system to detect an anomalous transaction amount that is divergent from the transaction estimation value in a transaction terminal 10 used for a transaction.

(6) The controller 21 executes the transaction content checking process. This allows the system to detect the occurrence status of a transaction having an anomalous transaction content that is divergent from the transaction estimation value in a transaction terminal 10 used for a transaction.

(7) The controller 21 executes the medium attribute checking process. This allows the system to detect the usage status of an anomalous medium attribute that is divergent from the transaction estimation value in a transaction terminal 10 used for a transaction.

(8) The controller 21 executes the facial image checking process. This allows the system to detect the usage status of an anomalous particular user that is divergent from the transaction estimation value in a transaction terminal 10 used for a transaction.

(9) The controller 21 executes the movement checking process. This allows the system to detect the usage statuses of multiple transaction terminals that are divergent from the transaction estimation value in a transaction terminal 10 used for a transaction.

(10) The controller 21 executes the individual medium checking process. This allows the system to detect the usage status of a medium, such as a cash card, divergent from the transaction estimation value in the user determined by an irreversible code.

The controller 21 is not limited to one that performs software processing on all processes executed by itself. For example, the controller 21 may include a dedicated hardware circuit (for example, application specific integrated circuit: ASIC) that executes hardware processing on at least part of the processes executed by itself. That is, the controller 21 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or instructions configured to cause the CPU to execute processes. The memories, or computer readable media, include any type of media that are accessible by general-purpose computers and dedicated computers.

The above-described embodiment may be modified as follows.

In the above-described embodiment, the controller 21 executes the process for calculating the divergence degree (S6-3). In this case, the information for calculating the divergence degree is not limited to the distance between terminals, the transaction time interval, and the standard movement speed. The controller 21 may use, for example, a movement path search service to calculate a required time for the movement between transaction terminals 10. In this case, the controller 21 calculates, as the divergence degree, the difference between the required time calculated in the movement path search service and the transaction time interval in the current transaction.

Determination may be performed differently between a regularly-used transaction terminal 10 and other transaction terminals 10. For example, the regularly-used transaction terminal 10 is determined using an irreversible code, thereby determining that the transaction with the transaction terminal 10 is performed in a familiar environment and setting the standard movement speed to be high. Thus, even if the transaction time interval is short, the divergence degree in a transaction terminal 10 that has been previously used can be reduced in accordance with the usage status of the transaction terminal 10.

In the above-described embodiment, the controller 21 executes the process for determining the terminal transaction model (S1-4) and the process for checking divergence from the terminal transaction model (S1-5). In this case, in a new transaction terminal 10, the terminal transaction model of another transaction terminal 10 may be used. Thus, the transaction information memory 23 stores the information for determining an environmental attribute of the installation place of a transaction terminal 10. The environmental attribute refers to, for example, the feature of environment in which users are common in facilities such as a bank branch, a convenient store, and a train station.

Figure 7:
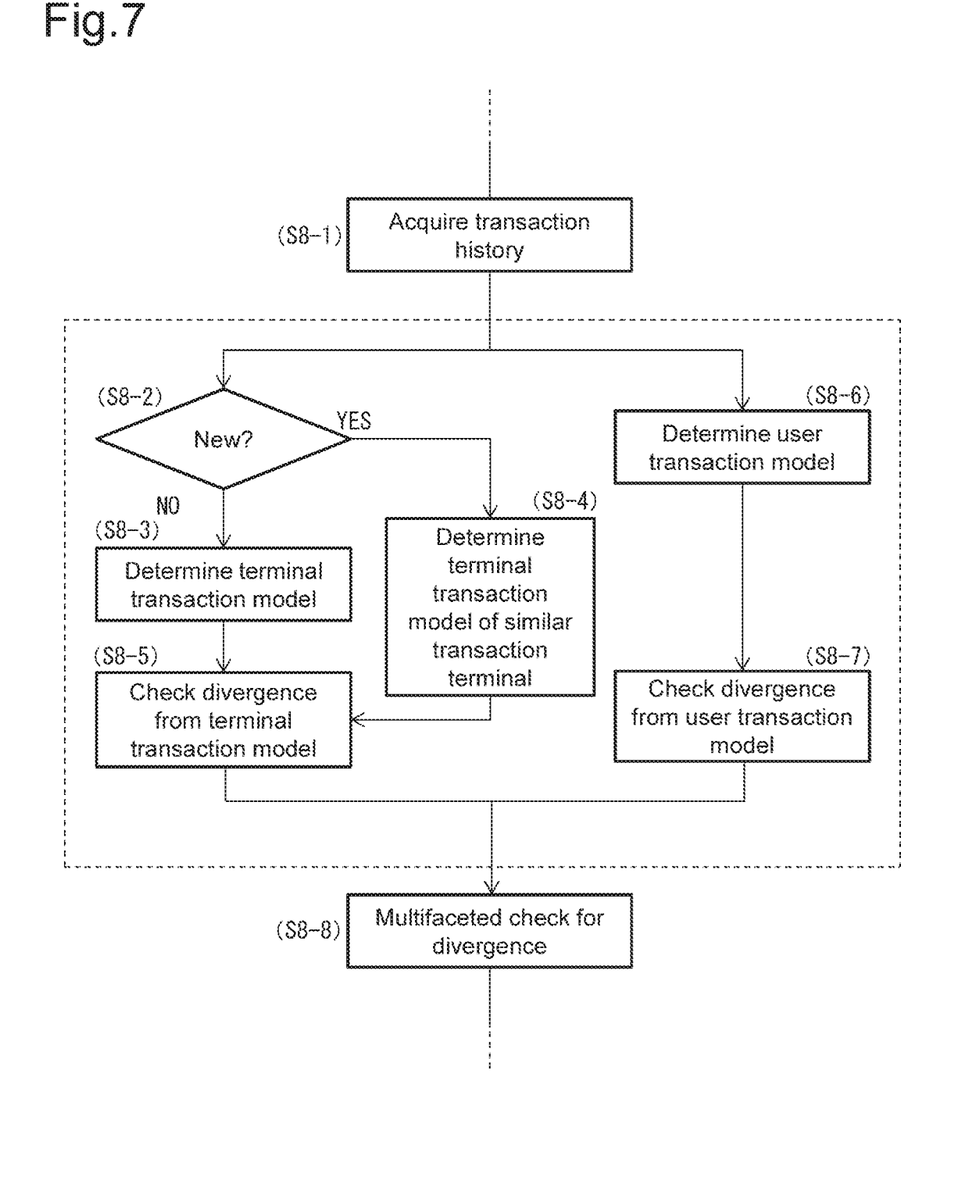
FIG. 7 is a flowchart illustrating a process flow in the system of FIG. 1.

FIG. 7 illustrates the flow of a fraud detection process in this case.

In the same manner as S1-3, the controller 21 executes a process for acquiring the transaction history (S8-1).

Next, the controller 21 executes a process for determining whether the transaction terminal 10 is new (S8-2). More specifically, the estimation unit 212 calculates the number of records of the transaction management record 220 acquired from the transaction information memory 22. Subsequently, the estimation unit 212 determines that the transaction terminal 10 is new when the number of records is less than a new check threshold value number.

When the number of records of the transaction management record 220 is greater than or equal to the new check threshold value number and the controller 21 determines that the transaction terminal 10 is not new ("NO" in S8-2), the controller 21 executes a process for determining the terminal transaction model in the same manner as S1-4 (S8-3).

When the number of records of the transaction management record 220 is less than the new check threshold value number and the controller 21 determines that the transaction terminal 10 is new ("YES" in S8-2), the controller 21 executes a process for determining the terminal transaction model of a similar transaction terminal (S8-4). More specifically, the estimation unit 212 uses the transaction information memory 23 to search for, from the address of the installation place of a new transaction terminal 10, other transaction terminals 10 that are installed within a predetermined range and are not new. Subsequently, among the other transaction terminals 10 installed in the predetermined range, the estimation unit 212 determines as a similar terminal a transaction terminal 10 having environmental attributes of the installation place common to environmental attributes of the installation place of the new transaction terminal 10. The estimation unit 212 uses the transaction management record 220 of the determined similar terminal to determine the terminal transaction model for the new transaction terminal 10.

Next, in the same manner as S1-5, the controller 21 executes a process for checking divergence from the terminal transaction model (S8-5).

Further, in the same manner as S1-6 and S1-7, the controller 21 executes a process for determining the user transaction model (S8-6) and a process for checking divergence from the user transaction model (S8-7).

In the same manner as S1-8, the controller 21 executes the multifaceted check process for divergence (S8-8).

In the above-described embodiment, the controller 21 executes a process for determining the terminal transaction model (S1-4). The controller 21 determines the terminal transaction model using the transaction management record 220 storing the terminal code of the transaction terminal 10 used for a transaction. In this case, the controller 21 may group multiple transaction terminals 10 and determine the terminal transaction model using the transaction management record 220 of a transaction terminal 10 that belongs to the group. For example, when the transaction information memory 23 detects the installation of multiple transaction terminals 10 in a particular store and/or within a predetermined proximate range, the controller 21 groups these transaction terminals 10.

In the above-described embodiment, the controller 21 executes the process for determining a terminal transaction model (S1-4). Further, the controller 21 executes the process for determining the user transaction model (S1-6). The transaction model may be prepared in advance through batch processing. In this case, the terminal transaction model associated with the terminal code and the user transaction model associated with the irreversible code are registered in a model memory of the monitoring device 20. When a new transaction request message is acquired, the controller 21 invokes the terminal transaction model associated with the terminal code and the user transaction model associated with the irreversible code that are used for checking divergence from the transaction estimation value based on the transaction model.

In the above-described embodiment, the controller 21 executes a multifaceted check process for divergence (S1-8). In this case, determination may be performed differently depending on an information accumulation status of the transaction management record 220 of the user and/or the transaction terminal 10. The controller 21 weights the divergence degree in accordance with the number of records of the transaction management record 220 storing, in the transaction terminal data region, the irreversible code in the current transaction. More specifically, when the divergence is large, the controller 21 weights the divergence degree to be higher than the transaction estimation value in a transaction model with a large number of records than the transaction estimation value in a transaction model with a small number of records.

In the above-described embodiment, the transaction models of a transaction amount, transaction content, medium type, medium issuer, and facial image are used to predict the successiveness of a transaction in each transaction terminal 10. Instead, for example, the transaction model may be a terminal transaction model of the successiveness of a transaction money amount. For example, the divergence from the transaction estimation value predicted from the terminal transaction model may be checked for the succession of the transaction of a particular transaction money amount range.

In the above-described embodiment, it is assumed that a user performs transaction such as cash withdrawal using, in the transaction terminal of a bank (present bank), a cash card (medium) for an account opened at another bank (other banks). However, the above-described embodiment may be applied to a transaction using a present bank account.

The medium for acquiring the individual identification information is not limited to a cash card. For example, as long as the individual identification information can be converted into a unique irreversible code, specific information of the mobile terminal of a user and/or biometric information of the user may be used.

In the above-described embodiment, the transaction terminal 10 is, for example, an ATM. Instead, the transaction terminal may be a PC terminal and/or a mobile terminal.

In the above-described embodiment, the monitoring device 20 acquires a transaction request message from the network switch 11. In an embodiment, the monitoring device 20 may acquire a transaction request message from the transaction terminal 10 and/or the host system 13.

In the above-described embodiment, the controller 21 executes the process for hashing the medium identification information (S1-2). In an embodiment, conversion (hashing) to an irreversible code from which individual information cannot be determined may be performed by the transaction terminal 10 or the host system 13. In this case, transaction information associated with the irreversible code is delivered to the monitoring device 20 separately from the transaction request message.

In the above-described embodiment, the estimation unit 212 performs Bayesian inference to determine a transaction model that will be performed in the future and calculate a transaction estimation value. Instead, various types of statistical techniques may be used to predict future transactions.

In the above-described embodiment, the controller 21 executes the process for acquiring the facial image of a user (S7-2). As long as the user can be determined from the person characteristic information, the facial image does not have to be acquired. For example, an image in which behavior is photographed and/or the operation status (operation speed or the like) of a transaction terminal may be used.

What is claimed is:

1. A fraud detection system comprising:
a transaction information memory that stores transaction information associated with an irreversible code into which individual identification information has been converted; and
a controller that acquires a transaction request from a transaction terminal and includes circuitry that further comprises a processor, wherein the processor is configured to:
generate a terminal transaction model by performing Bayesian inference on historical transaction data stored for the transaction terminal and transaction terminal identification information that comprises an installation place of the transaction terminal and a terminal code associated with the transaction request at the transaction terminal;
generate a user transaction model by performing Bayesian inference on the stored transaction information associated with the irreversible code;
convert the individual identification information into the irreversible code in response to acquiring the transaction request by hashing the individual identification information into the irreversible code, wherein the irreversible code is unique and the individual identification information comprises data characterizing a facial image of a user;
acquire transaction information associated with the transaction request including transaction terminal identification information;
store the acquired transaction information to update the stored transaction information associated with the irreversible code in the transaction information memory and update the historical transaction data stored for the transaction terminal;
calculate a transaction estimation value for a future transaction for each transaction terminal in the terminal transaction model that predicts an expected frequency of transaction information through Bayesian inference, and a transaction estimation value for a future transaction in the user transaction model that predicts an expected individual identification information frequency for each irreversible code through Bayesian inference based on the transaction information stored in the transaction information memory;
update the terminal transaction model and the user transaction model in response to calculating the transaction estimation value for the future transaction by performing Bayesian inference;
calculate, in response to acquiring new transaction information, a plurality of divergence ranges of the new transaction information based on a transaction estimation value for a first transaction terminal in the terminal transaction model and a transaction estimation value for an irreversible code in the user transaction model that corresponds to transaction terminal identification information included in the new transaction information; and
notify an administrator terminal with alert information in response to the new transaction information exceeding one or more of the plurality of divergence ranges by a divergence degree from a future transaction estimated for the transaction terminal in a multifaceted distribution with the plurality of divergence ranges.

2. The fraud detection system according to claim 1, wherein the circuitry is further configured to:
acquire a transaction amount in a most-recent predetermined period of the first transaction terminal;
compare the transaction amount with the transaction estimation value for the first transaction terminal; and
determine the divergence degree based on the comparison.

3. The fraud detection system according to claim 1, wherein the circuitry is further configured to:
acquire a transaction content in a most-recent predetermined period of the first transaction terminal;
compare the transaction content with the transaction estimation value for the first transaction terminal; and
determine the divergence degree based on the comparison.

4. The fraud detection system according to claim 1, wherein the circuitry is further configured to:
acquire a medium attribute of a transaction in a most-recent predetermined period of the first transaction terminal;
compare the medium attribute with the transaction estimation value for the first transaction terminal; and determine the divergence degree based on the comparison.

5. The fraud detection system according to claim 1, wherein the circuitry is further configured to:
acquire person feature information of a user in a transaction in a most-recent predetermined period of the first transaction terminal;
compare the person feature information with the transaction estimation value for the first transaction terminal; and
determine the divergence degree based on the comparison.

6. The fraud detection system according to claim 1, wherein
the new transaction information is related to a transaction in a first time by the first transaction terminal, and
the circuitry is further configured to:
determine a second transaction terminal and a second time related to a last transaction associated with the irreversible code in the new transaction information; and
determine the divergence degree based on a movement distance between the first transaction terminal and the second transaction terminal and an interval between the first time and the second time.

7. The fraud detection system according to claim 1, wherein the circuitry is further configured to:
calculate an information accumulation degree for each transaction terminal and for each irreversible code based on a number of pieces of the transaction information stored in the transaction information memory; and
weight the transaction estimation value for each transaction terminal and for each irreversible code based on the information accumulation degree.

8. The fraud detection system according to claim 1, wherein the circuitry is further configured to:
group two or more transaction terminals based on an installation location for each transaction terminal; and
determine a transaction estimation value for the grouped transaction terminals.

9. The fraud detection system according to claim 1, wherein the circuitry calculates an information accumulation degree of the first transaction terminal based on a number of pieces of the transaction information stored in the transaction information memory, and
when the calculated information accumulation degree of the first transaction terminal is below a threshold, the circuitry determines an attribute of the first transaction terminal, determines a second transaction terminal having an attribute similar to the attribute of the first transaction terminal and having a information accumulation degree that meets or exceeds the threshold, and uses a transaction estimation value for the second transaction terminal as the transaction estimation value for the first transaction terminal.

10. A fraud detection method for detecting fraud using a fraud detection system, the fraud detection system comprising:
a transaction information memory that stores transaction information associated with an irreversible code into which individual identification information has been converted; and
a controller that acquires a transaction request from a transaction terminal, the method comprising, by circuitry of the controller:
generating a terminal transaction model by performing Bayesian inference on historical transaction data stored for the transaction terminal and transaction terminal identification information that comprises an installation place of the transaction terminal and a terminal code associated with the transaction request at the transaction terminal;
generating a user transaction model by performing Bayesian inference on the stored transaction information associated with the irreversible code;
converting the individual identification information into the irreversible code in response to acquiring the transaction request by hashing the individual identification information into the irreversible code, wherein the irreversible code is unique and the individual identification information comprises data characterizing a facial image of a user;
acquiring transaction information associated with the transaction request including transaction terminal identification information;
storing the acquired transaction information to update the stored transaction information associated with the irreversible code in the transaction information memory and update the historical transaction data stored for the transaction terminal;
calculating a transaction estimation value for a future transaction for each transaction terminal in the terminal transaction model that predicts an expected frequency of transaction information through Bayesian inference, and a transaction estimation value for a future transaction in the user transaction model that predicts an expected individual identification information frequency for each irreversible code based on the transaction information stored in the transaction information memory;
updating the terminal transaction model and the user transaction model in response to calculating the transaction estimation value for the future transaction by performing Bayesian inference;
calculating, in response to acquiring new transaction information, a plurality of divergence ranges of the new transaction information based on a transaction estimation value for a first transaction terminal in the terminal transaction model, and a transaction estimation value for an irreversible code in the user transaction model that corresponds to transaction terminal identification information included in the new transaction information; and
notifying an administrator terminal with alert information in response to the new transaction information exceeding one or more of the plurality of divergence ranges by a divergence degree from a future transaction estimated for the transaction terminal in a multifaceted distribution with the plurality of divergence ranges is large.

11. A non-transitory computer-readable medium that stores instructions for detecting fraud using a fraud detection system, the fraud detection system comprising:
a transaction information memory that stores transaction information associated with an irreversible code into which individual identification information has been converted; and
a controller that acquires a transaction request from a transaction terminal, wherein the instructions, when executed, causes a processor of the controller to:
generate a terminal transaction model by performing Bayesian inference on historical transaction data stored for the transaction terminal and transaction terminal identification information that comprises an installation place of the transaction terminal and a terminal code associated with the transaction request at the transaction terminal;

generate a user transaction model by performing Bayesian inference on the stored transaction information associated with the irreversible code;

convert the individual identification information into the irreversible code in response to acquiring the transaction request by hashing the individual identification information into the irreversible code, wherein the irreversible code is unique and the individual identification information comprises data characterizing a facial image of a user;

acquire transaction information associated with the transaction request including transaction terminal identification information;

store the acquired transaction information to update the stored transaction information associated with the irreversible code in the transaction information memory and update the historical transaction data stored for the transaction terminal;

calculate a transaction estimation value for a future transaction for each transaction terminal in the terminal transaction model that predicts an expected frequency of transaction information through Bayesian inference, and a transaction estimation value for a future transaction in the user transaction model that predicts an expected individual identification information frequency for each irreversible code through Bayesian inference based on the transaction information stored in the transaction information memory;

update the terminal transaction model and the user transaction model in response to calculating the transaction estimation value for the future transaction by performing Bayesian inference;

calculate, in response to acquiring new transaction information, a plurality of divergence ranges of the new transaction information based on a transaction estimation value for a first transaction terminal in the terminal transaction model and a transaction estimation value for an irreversible code in the user transaction model that corresponds to transaction terminal identification information included in the new transaction information; and notify an administrator terminal with alert information in response to the new transaction information exceeding one or more of the plurality of divergence ranges by a divergence degree from a future transaction estimated for the transaction terminal in a multifaceted distribution with the plurality of divergence ranges.

* * * * *